United States Patent [19]
Takato et al.

[11] Patent Number: 5,154,743
[45] Date of Patent: Oct. 13, 1992

[54] GREASE EXTRACTOR

[75] Inventors: Takashi Takato, Nabari; Toshihiro Higashino, Osaka, both of Japan

[73] Assignee: Kuraco Limited, Osaka, Japan

[21] Appl. No.: 687,156

[22] Filed: Apr. 18, 1991

[30] Foreign Application Priority Data

Apr. 19, 1990 [JP] Japan .................. 2-104315

[51] Int. Cl.$^5$ .................................................. B01D 46/00
[52] U.S. Cl. ......................................... 55/317; 55/466; 55/473; 55/485; 55/406; 55/403
[58] Field of Search ................... 55/400, 401–403, 55/406, 317, 466, 473, 485

[56] References Cited

U.S. PATENT DOCUMENTS

| | | | |
|---|---|---|---|
| 1,075,736 | 10/1913 | Spiegel | 55/400 |
| 1,114,058 | 10/1914 | Spencer | 55/317 |
| 2,188,031 | 1/1940 | Brock | 55/403 |
| 4,189,310 | 2/1980 | Hotta | 55/400 |
| 4,908,050 | 3/1990 | Nagashima et al. | 55/400 |
| 4,922,691 | 5/1990 | Shen | 55/408 |

FOREIGN PATENT DOCUMENTS

58-11373  3/1983  Japan .
116719    5/1988  Japan ..................... 55/400

*Primary Examiner*—Bernard Nozick
*Attorney, Agent, or Firm*—Armstrong & Kubovcik

[57] ABSTRACT

A grease extractor includes a fan for forcibly flowing grease laden air to remove grease therefrom in cooperation with a membrane filter and a trap member. The grease extractor comprises a vessel with an inlet for introduction of the grease laden air and an outlet for discharging clear air removed of the grease. The membrane filter is disposed in a flow path between an inlet and an outlet of the extractor to seize the grease while passing the grease laden air therethrough. A trap member is disposed downstream of the membrane filter to deflect the air to cause collision of the grease laden air against the trap member to deposit the grease thereon. The trap member is formed with a recovery line for collecting and draining the deposit grease out of the vessel. The membrane filter is thin enough such that relatively small grease particles once seized in the membrane filter are allowed to move by the action of the forced flow to the downstream surface of the membrane filter and coagulate thereat into greater grease particles. Such greater grease particles are then caused to leave from the membrane filter by the force air flow so as to be again carried on the air flowing toward the trap member. The air carrying the greater grease particles is brought into collision with the trap member to efficiently deposit the grease on the trap member for recovery thereof, while leaving clean air to be discharged out of the vessel.

7 Claims, 8 Drawing Sheets

GREASE EXTRACTOR

BACKGROUND OF THE INVENTION

1. Field of the Invention

The present invention is directed to a grease extractor, and more particularly to a grease extractor in which grease laden air is forced to flow through a membrane filter and is deflected on a trap member disposed downstream of the filter for removal of the grease by deposition on the trap member.

2. Description of the Prior Art

In a factory operating lathes and grinders, there has been a potential hazard of contaminating environment with grease employed in the operation of the lathes and grinder. To remove the grease from grease laden air, grease extractors have been widely utilized in the art. As disclosed in Japanese Utility Model Publication (KOKOKU) No. 58-11373, most of the prior grease extractors are designed to operate on a basic principle of forcibly flowing the grease laden air through one or more filters to seize the grease thereat. For increased grease trapping capacity, the filter is required to be of relatively thick. However, the use of such thick filter poses a problem that the filter when saturated with the grease will impede the forced air flow to reduce the volume of flow, remarkably lowering grease removal efficiency. Therefore, the filter has to be replaced frequently. Additionally, in the prior grease extractor it is a general practice to design blow capacity of a fan responsible for generating the forced air flow in accordance with an initial flow resistance of the filter. Consequently, as the grease accumulates in the filter, the volume of flow will reduce to lower the grease trapping efficiency within the life time of the filter, which makes it impossible to obtain a consistent grease trapping efficiency over the operational life of the grease extractor.

SUMMARY OF THE INVENTION

The above problems have been eliminated in the present invention which provides an uniquely configured grease extractor for removing grease from a grease laden air and discharging a clean air removed of the grease. The grease extractor in accordance with the present invention comprises a vessel having an inlet for introducing the grease laden air and an outlet for discharging the clean air. The vessel defines therein a flow path extending from the inlet to the outlet. Fan means is provided to generate a forced flow of introducing the grease laden air through the inlet and forcing it toward the outlet. At least one membrane filter is disposed in the flow path to seize the grease in the flowing air and permit the air to pass therethrough. Disposed downstream of the membrane filter is trap means which deflects the grease laden air in such a manner as to cause collision of the grease laden air against the trap means, thereby depositing the grease thereon. The trap means is provided with recovery means for collecting and draining the deposited grease out of said vessel. The membrane filter is made thin enough such that relatively small grease particles once seized in the membrane filter are allowed to move by the suction force of the forced flow to the downstream surface of the membrane filter and coagulate thereat into greater grease particles which are caused to leave from the membrane filter and be again carried on the forced flow toward the trap means to be deposited thereat. Thus, as soon as the thin membrane filter becomes nearly saturated with the grease, the grease particles will be forced to move under the forced air flow condition into the downstream surface of the membrane filter to coagulate thereat into relatively great grease particles which are then again carried on the forced air flow rather than remaining in the filter and are subsequently deposited on the trap members downstream of the filter. Accordingly, the membrane filter are always kept in nearly saturated condition to thereby exhibit substantially constant flow resistance over the extended time of period, which makes it readily possible to keep generating a constant volume of flow simply by selecting the flow capacity of the fan in accordance with the nearly saturated condition of the membrane filter, resulting in constant grease trapping efficiency.

Accordingly, it is a primary object of the present invention to provide an improved grease extractor which is capable of removing the grease from the grease laden air at a constant grease trap efficiency over an extend period of time without causing any substantial lowering in the volume of the air flow through the filter, yet assuring to successfully separate the grease from the grease laden air with improved efficiency.

In a preferred embodiment, the grease extractor comprises a plurality of separator units disposed between the inlet and the outlet. Each separator units comprises a casing with an intake port and an exit port which define therebetween a flow path for said grease laden air. The case accommodates a fan which generates a forced flow of forcing the grease laden air from the intake port toward the exit port along the flow path, the membrane filter disposed in the flow path to seize the grease in the air and permitting the air to pass therethrough, and the trap member which is defined on the interior wall of the casing to deflect the grease laden air after passing through the fan such that the grease laden air collides against the trap member to deposit the grease thereon. These separator units are arranged in series between the inlet and output in such a manner as to communicate the intake port and the exit port between the adjacent units, to communicate the intake port of a first upstream one of the separators unit with the inlet and to communicate the exit port of the last downstream one of the separator units with the outlet. With this multi-stage grease trapping structure, the grease not separated from the air at the preceding separator unit can be successfully separated at the downstream separator units, thereby increasing grease trapping efficiency.

It is therefore another object of the present invention to provide an improved grease extractor which is capable of efficiently removing the grease to leave clean air being discharged out of the extractor.

Preferably, each fan is a centrifugal fan rotating about a common center axis and having the intake port about the center axis. The fan is also formed with a plurality of radially extending blades for drawing said grease laden air from the intake port and flowing the forced air flow radially outwardly of the fan. The separator unit also accommodates a barrel which is located downstream of the fan within the same separator unit and comprises an axially spaced pair of front and bottom plates defining therebetween an open space. The membrane filter is provided in the form of a ring supported on the barrel to surround a periphery of the open space such that the grease laden air flowing from the adjacent fan and deflected at the trap member at the interior surface of the separator unit is allowed to pass the membrane filter radially inwardly into the open space. The rear plate is perforated to define the exit port of the separator unit so as to emerge the grease laden air out of the barrel or the separator unit and feed the same into the intake port of the fan in the next separator unit. With this arrangement, the fan and the barrel supporting the membrane filter can be closely disposed in tandem relation along the center axis of the fan within each separator unit, thus reducing the dimension of the separator unit in the axial direction, while assuring to flow the grease laden air radially outwardly and deflect it on the trap member to flow radially inwardly though the membrane filter over an extended flow path within the separator unit.

It is therefore a further object of the present invention to provide an improved grease extractor which is capable of being made compact yet with increased grease separation efficiency.

The barrel is formed with a plurality of radially extending vanes between the front and rear plates for guiding the grease laden air radially inwardly from the filter to the exit port. Preferably, the blades of the fan and/or the vanes of the barrel are bent at an angle in the circumferential direction about the common center axis so that the grease laden air has an increased chances of colliding against the blades and/or vanes, thereby enhancing the coagulation of the small grease particles thereat into greater grease particles which are carried again on the air to be readily deposit on the trap members, thereby increasing the grease trapping efficiency at the trap members. It is therefore a still further object of the present invention to provide an improved grease filter in which the grease particles carried in the air can be made greater before reaching the trap member so as to easily deposit at the trap member, leading to increased grease trapping efficiency.

The trap member extends over the peripheries of the fan and the membrane filter in a radially spaced relation thereto and are formed with a plurality of grooves for retaining the grease deposited thereon. The grooves are spaced circumferentially about the common axis of the fan and extend in an inclined relation with respect to the common axis. The grooves terminate in a trough extending circumferentially in the trap member for collecting the grease into the trough which is slotted to have a drain for recovering the collected grease therethrough outwardly of the casing. Thus, the grease deposited on the trap member on the interior surface of the casing can be smoothly collected through the inclined grooves, trough, and through the drain outwardly of the separator unit or the vessel.

It is therefore a still further object of the present invention to provide an improved grease extractor which is capable of smoothly collecting the deposited grease out of the vessel.

These and still other objects and advantages of the present invention will become more apparent from the following description of the preferred embodiment when taken in conjunction with the attached drawings.

DETAILED DESCRIPTION OF THE PREFERRED EMBODIMENT

Figure 1:
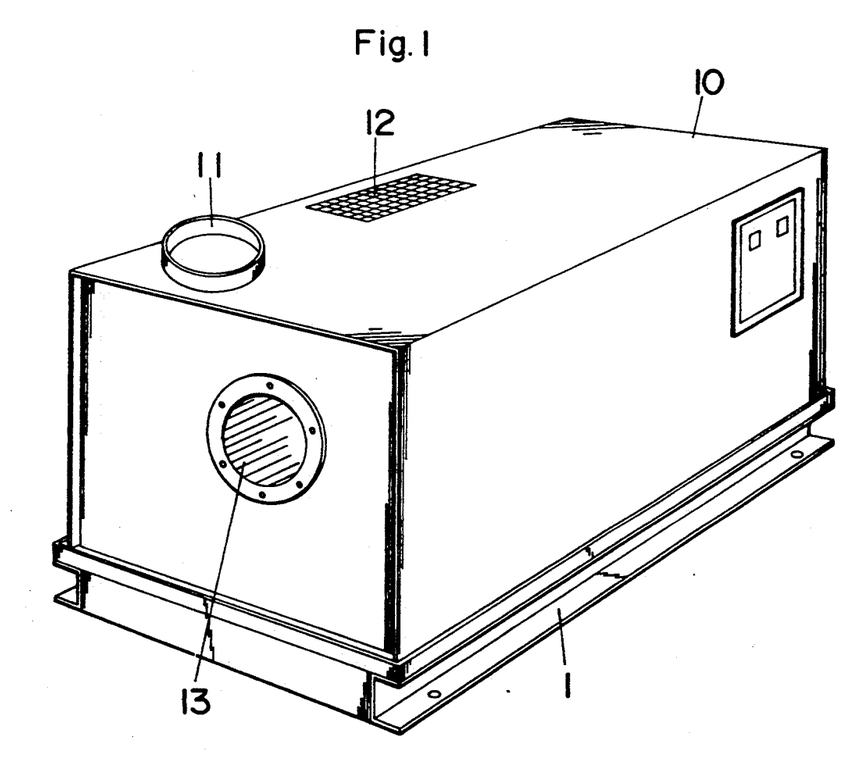
FIG. 1 is an external view in perspective of an grease extractor in accordance with a preferred embodiment of the present invention.
Figure 2:
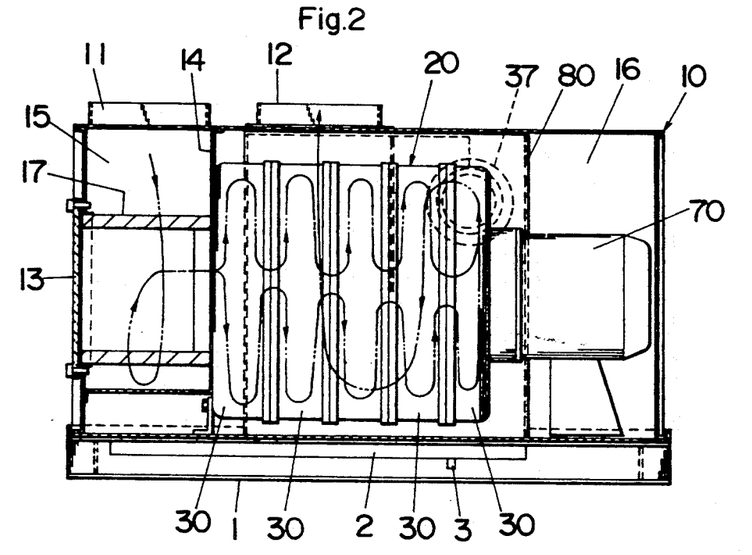
FIG. 2 is a vertical sectional view of the grease extractor.
Figure 3:
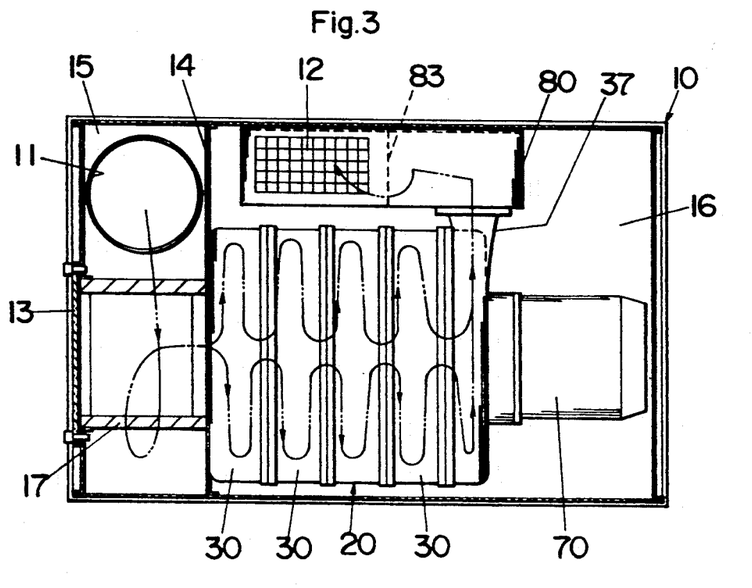
FIG. 3 is a horizontal sectional view of the grease extractor.

Referring now to FIG. 1, there is shown a grease extractor in accordance with a preferred embodiment of the present invention which is, for example, installed in factories running lathes or grinders which require the supply of grease for operation. The grease extractor comprises a rectangular housing 10 with an inlet 11 and an outlet 12 both of which are opened in a top wall of the housing 10 in spaced relation along the lengthwise direction. The inlet 11 is connected to a hood or the like located adjacent the lathes or the grinders for introducing grease laden air, while the outlet 12 is grilled for discharging clear air removed of the grease. As shown in FIGS. 2 and 3, the interior of the housing 10 is divided by a partition 14 into a front chamber 15 and a rear chamber 16. The front chamber 15 communicates at its upper end with the inlet 11 and includes a barrel filter 17 mainly for separating dust, impurities or the like foreign matter carried on the air prior to removing the grease at a separator assembly 20 housed within the rear chamber 16. The tubular filter 17 has its front open end Closed by a transparent plate 13 removably attached in the front end wall of the housing 10 and the rear open end communicated through an opening in the partition with a front opening of the separator assembly 20 so that the grease laden air introduced from the inlet 11 flow radially inwardly through the tubular filter 17 and is fed into the separator assembly 20 while entrapping the foreign matter in the barrel filter 17. When the tubular filter 17 becomes clogged, the condition of which can be easily monitored through the transparent plate 13, the tubular filter 17 can be replaced through the front wall of the housing 10 by removing the plate 13. A base 1 is provided to mount thereon the housing 10 as well as a tray 2 which extends on the bottom wall of the housing 10 to collect the separated grease from the separator assembly 20 The tray 2 includes a drain coupling 3 for connection to a grease disposal line or recovery receptacle.

Figure 4:
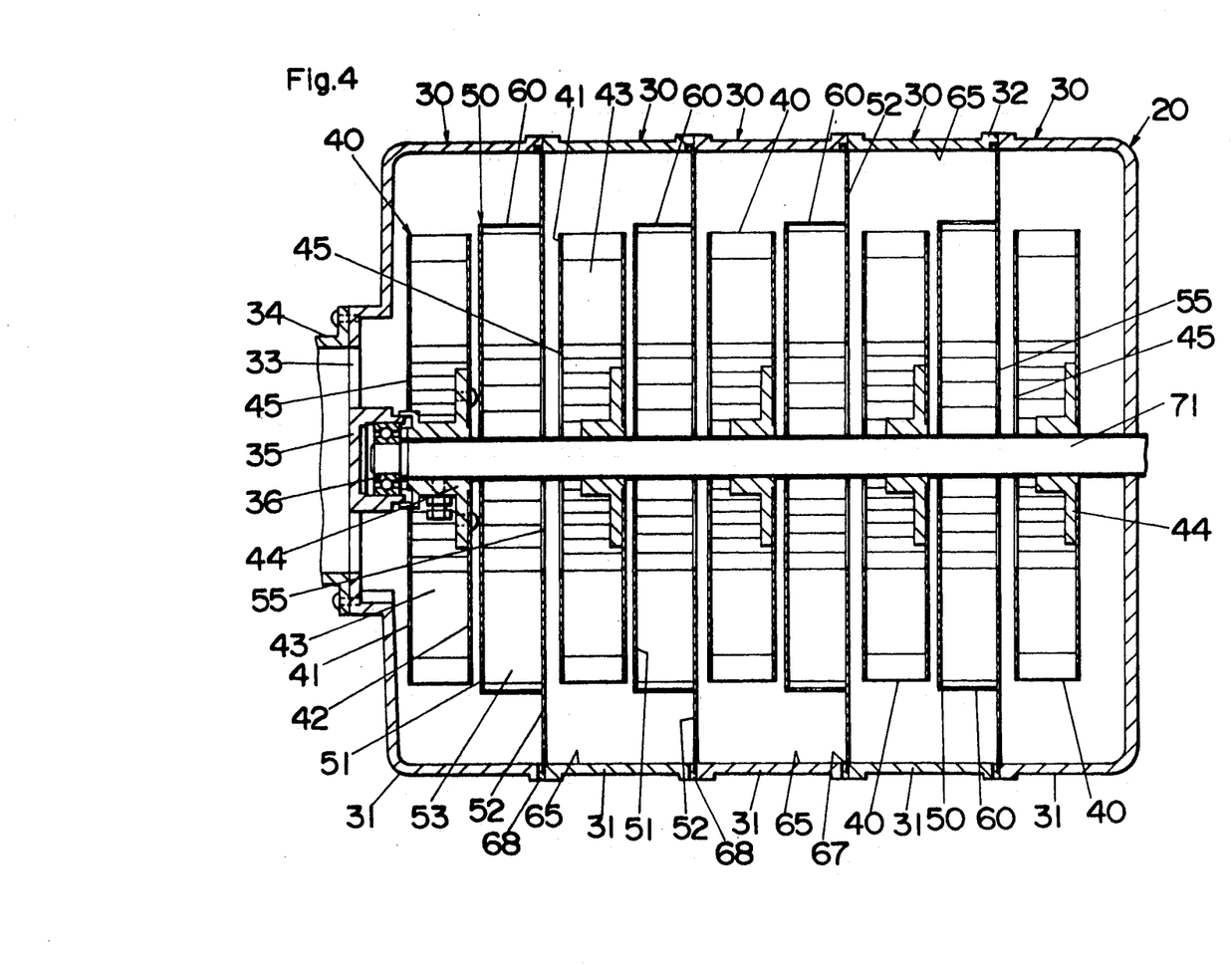
FIG. 4 is a vertical sectional view of a number of separator units arranged in tandem relation in a housing of the grease extractor.
Figure 5:
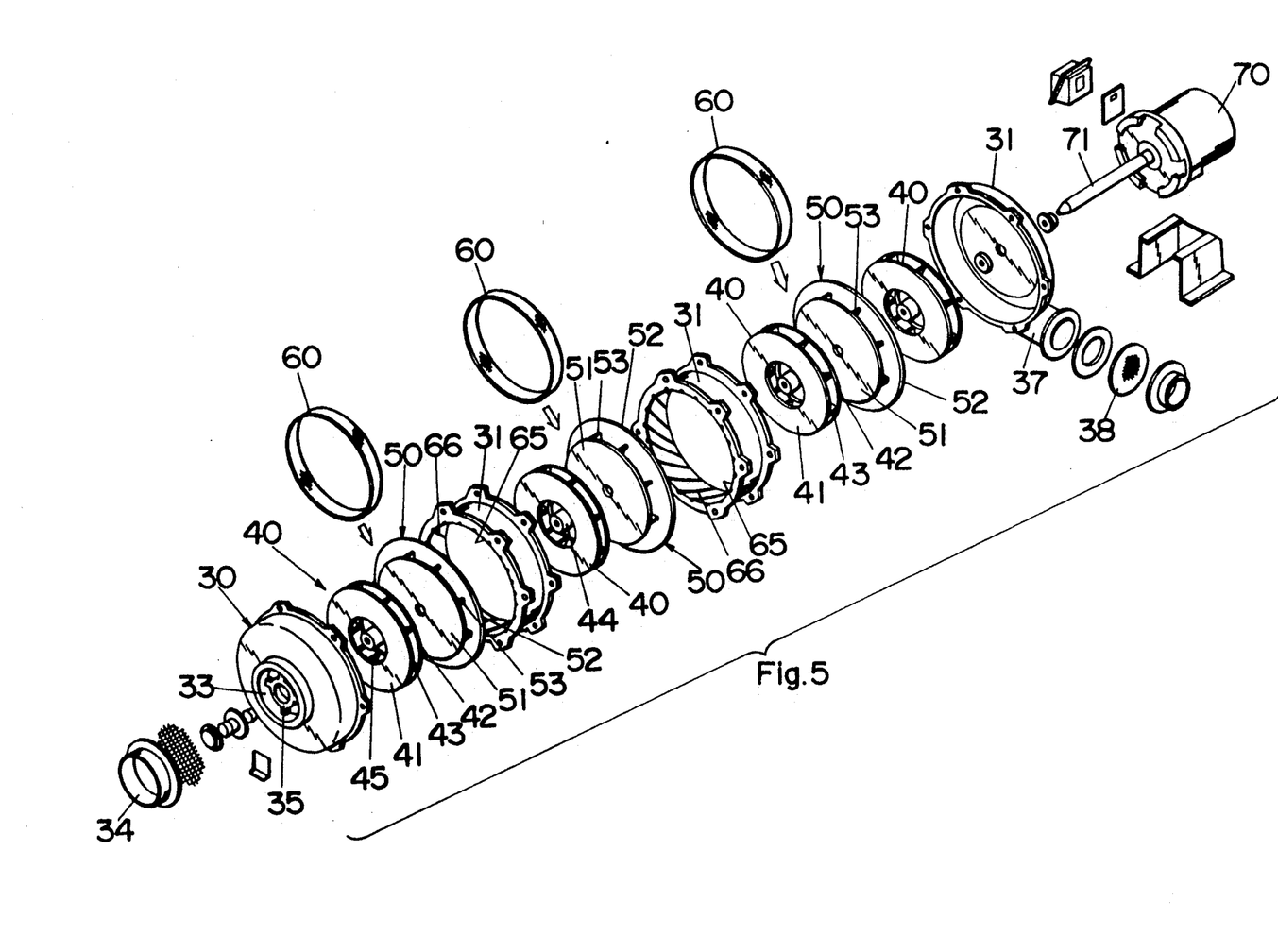
FIG. 5 is an exploded perspective view of the separator units.
Figure 6:
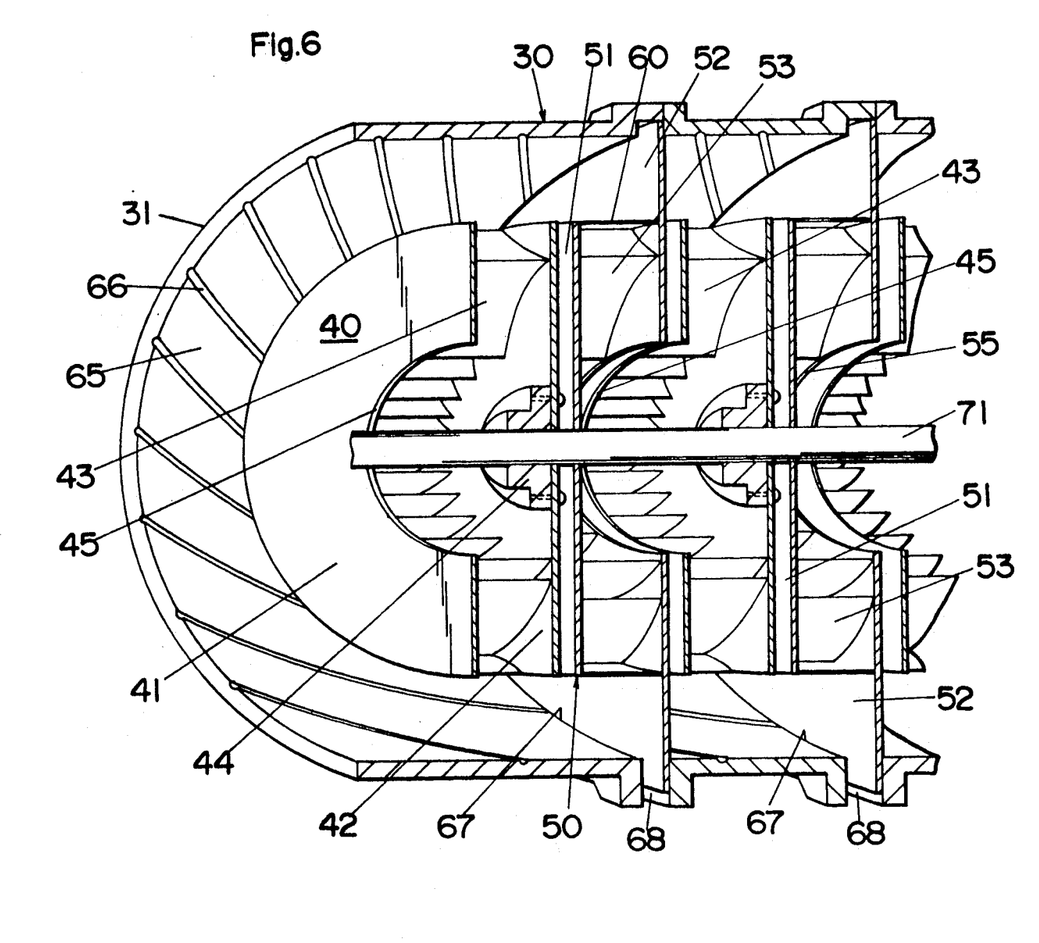
FIG. 6 is a partial view illustrating an internal structure of the separator units with a portion being cut away.

As best shown in FIGS. 4 and 5, the separator assembly 20 comprises a plurality of separator units 30 each comprising a flat circular casing 31 and a centrifugal fan 40. A flat barrel 50 carrying a membrane filter 60 is also included in the separator units 30 except for the rearmost separator unit. A motor 70 is attached to the rearmost separator unit 30 to have its output shaft 71 extending through the separator units 30, as shown in FIG. 4, so as to carry the individual fans 40 for rotation thereof about a common axis. Thus, the separator units 30 are disposed in tandem arrangement along the motor output shaft 71 and are secured to each other by flanges 32 at the junctures between the adjacent casings 31. The front separator unit 30 is formed With a front opening 33 with a sleeve 34 projecting into the interior of the tubular filter 17 through the partition 14 for fluid communication therewith. Located at the center of the front opening 33 is a holder 35 of a bearing 36 rotatively supporting the free end of the motor output shaft 71. The last separator unit 30 has a duct 37 extending from one peripheral portion of the casing 31 for communication with an exhaust chamber 80 received in the housing 10 in an side-by-side relation with the separator assembly 20. The exhaust chamber 80 is opened at its upper end to the outlet 12 for discharging the clean air of which grease is removed at the separator assembly 20.

Figure 7:
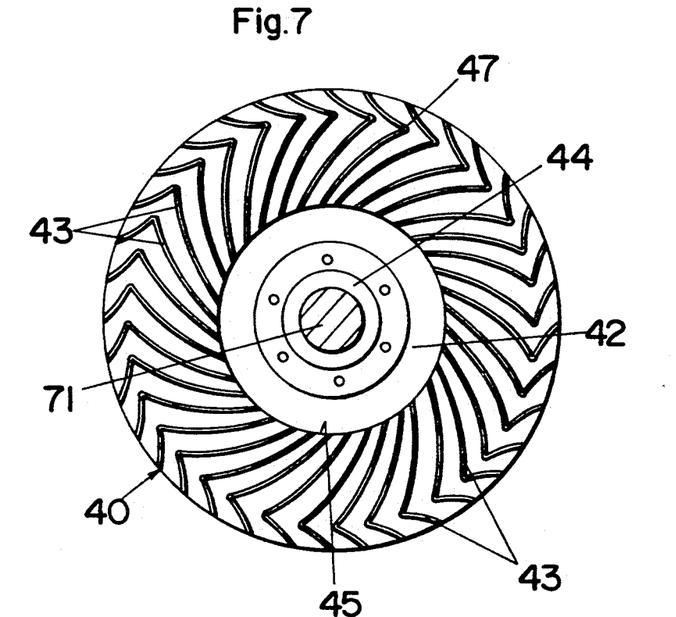
FIG. 7 is a front view illustrating a number of blades forming a fan which is mounted in the separator unit with a front disk removed therefrom.

The fan 40 comprises a number of blades 43 held between an axially spaced pair of a front disc 41 and a rear disc 42. The rear disc 42 carries a hub 44 surrounding the motor output shaft 71 for driving connection thereto. The front disc 41 is formed in its Center about the output shaft 71 with an intake port 45 for drawing the air therethrough. As shown in FIG. 7, the blades 43 extends radially in circumferentially spaced relation about the motor output shaft 71. Thus, as the fan 40 rotates it draws the air through the intake port 45 and forces it to flow radially outwardly along the blades 43 toward the peripheral wall of the casing 31. It is noted in this connection that the blades 43 are each bent at an angle intermediate its ends in the circumferential direction to form thereat a bent 47 which acts to deflect the air flowing along the blade 43.

Figure 8:
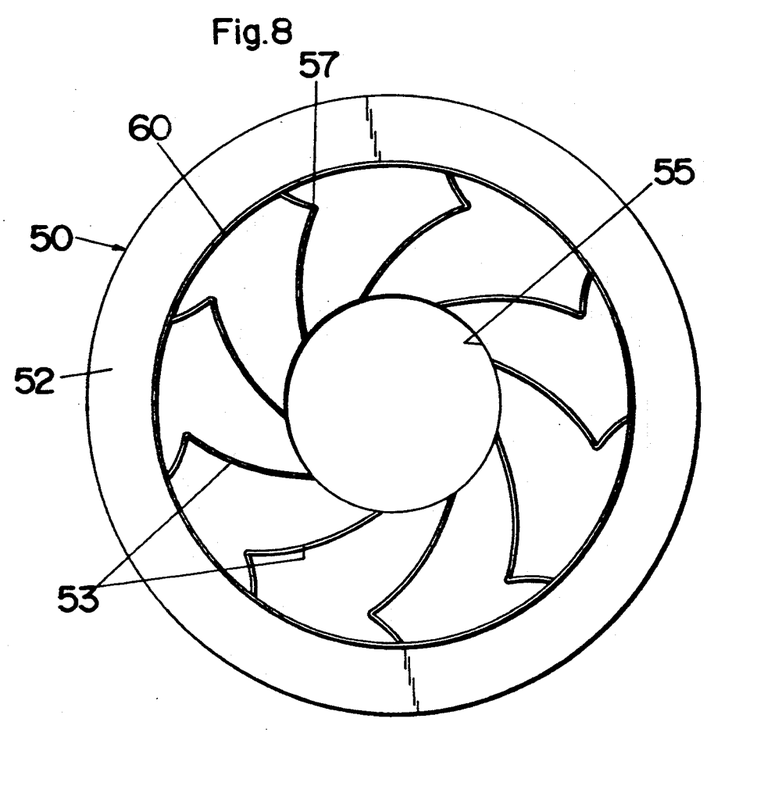
FIG. 8 is a front view illustrating a number of vanes forming a barrel which is mounted downstream of the fan in the separator unit with a front plate removed therefrom.

The barrel 50 has an radial dimension approximately equal to that of the fan 40 and is disposed behind the fan 40 within the casing 31 of the separator unit 30 in a closely adjacent relation as well as in a coaxial relation thereto. The barrel 50 comprises an axially spaced pair of a front plate 51 and a rear plate 52 between which a number of vanes 53 are held. As shown in FIG. 8, the vanes 53 are each bent at an angle intermediate its ends in the circumferential direction to form thereat a bent 57 which acts to deflect the air flowing along the vanes 43. An exit port 55 is formed in the center of the rear plate 52 about the motor output shaft 71. The rear plate 52 which has a greater diameter than the front plate 51 has its marginal portion held between the adjacent casings 31 to fix the barrel 50 in position about the motor output shaft 71 as well as to isolate the adjacent separator units 30 except for the exit port 55. The open periphery of the barrel 50 is surrounded by the membrane filter 60 through which the grease laden air is forced to flow radially inwardly for seizing the grease carried on the air. The air passed through the membrane filter 60 is guided along the vanes 53 radially inwardly and is then flown outwardly axially through the exit port 55. Thus, the air is forced by the fan 40 to be drawn axially through the intake port 45 and flown radially outwardly along the fan blades 43, then deflected on the interior peripheral surface 65 of the casing 31 to turn the flow direction abruptly, filtered along the vanes 53 of the barrel 50, and expelled axially through the exit port 55 into the intake port of the next separator unit 30. As shown in FIG. 4, the adjacent separator units 30 are assembled in such a manner as to have the exit ports 55 of the upstream separator unit 30 in fluid communication with the intake port 45 of the downstream one, while the first or front separator unit 30 has is its intake port 45 in communication with the inlet 11 through the front opening 33, sleeve 34, and through front chamber 15. Consequently, a tortuous flow path with many abrupt direction changes can be formed in the separator assembly 20, as shown in dotted lines in FIGS. 2 to 4.

Figure 12:
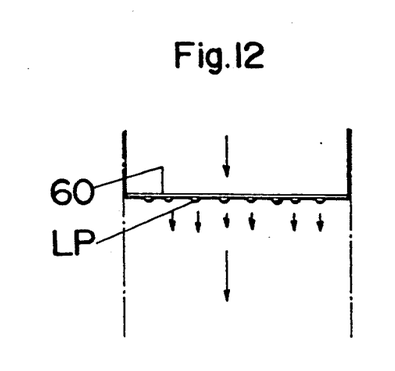
FIG. 12 is a schematic view illustrating a behavior of the grease seized by a membrane filter under a forced air flowing therethrough.

The membrane filter 60 may be a woven or unwoven fabric made from synthetic, ceramic, or metal fibers, or may be a paper having a thickness as less as 0.5 mm to 2.0 mm with capability of seizing grease particles of the size between 0.5 $\mu$m to 1.0 $\mu$m. The membrane filter 60 is supported by a ring shaped or flat cylinder-like reticulated frame (not shown) which is in turn held between the front and rear plates 51 and 52 to surround the open periphery of the barrel 50. Because of the thin structure, the membrane filter 60 will be soon saturated by the grease particle seized therein. However, under the forced air flow condition, the grease particles in the membrane filter 60 are forced to move into the downstream surface of the filter 60 and caused to coagulate into relatively large grease particles indicated by LP in FIG. 12, which large particles LP are then again carried on the air to leave the membrane filter 60 as soon as the membrane filter 60 is nearly saturated. In other words, the membrane filter 60 can be kept in nearly saturated condition while flowing the grease laden air therethrough, thus exhibiting substantially constant flow resistance and therefore assuring to obtain substantially constant volume of flow. The grease particles after leaving the membrane filter 60 will be again drawn into the fan 40 of the next separator unit 30 and is forced to flow radially outwardly of the fan 40 to collide against the interior peripheral surface 65 of the casing 31 at which the air flow is abruptly deflected to thereby deposit the grease particles on that surface of the casing 31. In this sense, the interior peripheral surface 65 defines a trap member for separating the grease particles from the grease laden air. The grease particles left carried on the air can be likewise caused to coagulate at the following filters 60 and then deposited at the trap member 65. In this manner, the grease laden air can be removed of the grease through the successive separator units 30 so as to discharge the clean air through the exhaust chamber 90 out of the outlet 12. It is should be noted at this point that since the blades 43 of the fan 40 and the vanes 53 of the barrel 50 have vents 47 and 57, respectively, the grease laden air will experience deflection thereat, enhancing the coagulation of the grease particles by the baffling effect trap member 65 with increased grease trapping efficiency. Particularly, as shown in FIG. 8, since flow paths defined between the adjacent vanes are constricted at the radial inner ends, the grease laden air is fed through the barrel 50 into the fan 40 of the next separator unit 30 with increased flow velocity, thereby enhancing the deposition of the grease at the trap member 65. Nevertheless, it is of course possible to use the blades or vanes without the vents.

Figure 9:
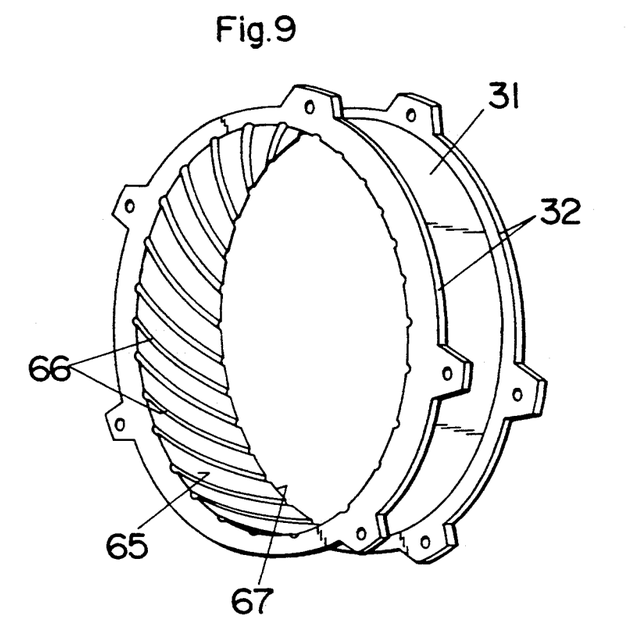
FIG. 9 is a perspective view of a casing surrounding the separator unit.

As shown in FIG. 9, the casing 31 is formed in its interior surface or trap member 65 With a number of grooves 66 spaced circumferentially and extending in a direction inclined with respect to the axis of the casing 31 or the motor output shaft 71 for collecting the grease deposited on the surface 65 therein. The grooves 66 terminate in an annular trough 67 formed in the axial end of casing 31 to gather the grease collected in the respective grooves 65 into the trough 67. A drain 68 is formed in the lower end of the trough 67 for drainage of the collected grease out of the separator unit 30 into the tray 2 disposed below the separator assembly 20. The grooves 66 may take other suitable forms for guiding the deposited greases to the trough 67. The trap member 65 in the first separator unit 30 is also responsible for deposition of the grease from the air which is deflected thereon after passing through the fan 40. In other words, as the grease laden air flows radially through the fan 40 of the first separator unit 30, the grease contained therein are caused to coagulate into large particles by the centrifugal forces acting thereon, and are then deposited on the trap member 65 of the first separator unit 30 by being abruptly deflected thereon, after which the air is removed of grease still carried thereon through the steps of flowing through the filter 40 followed by being deflected at the subsequent trap members 65 as explained hereinbefore.

Figure 10:
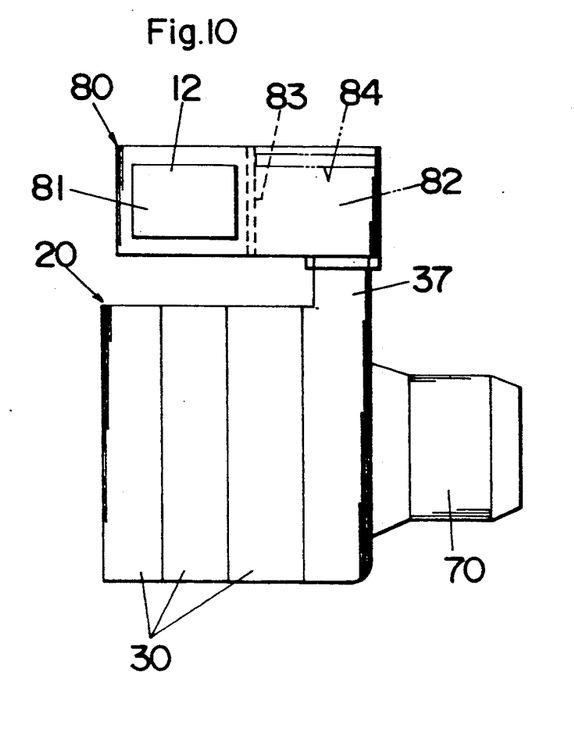
FIGS. 10 and 11 are respectively top view and rear views of the separator units with an exhaust duct.
Figure 11:
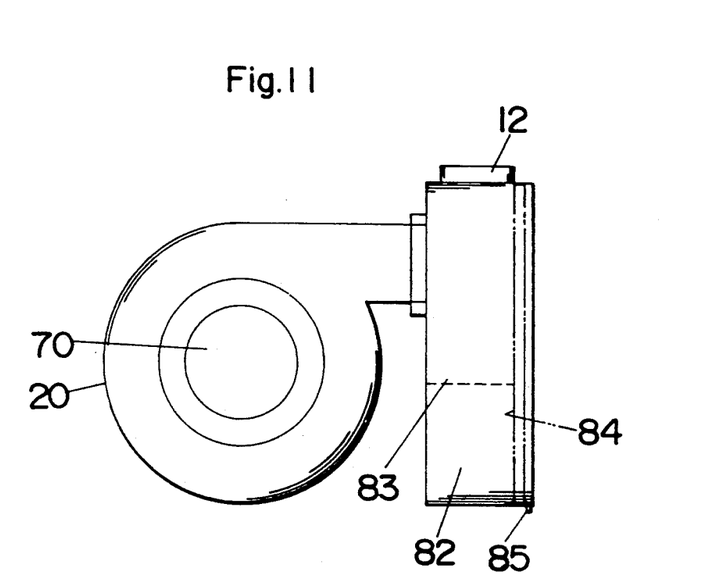

The air from the last separator unit 30 is fed through a like membrane filter 38 disposed in the duct 37 into the exhaust chamber so. As shown in FIGS. 10 and 11, the chamber 80 is divided by a depending wall 83 into a front section 81 with the outlet 12 at its upper end and a rear section 82 communicated with the duct 37 in the upper portion of a side wall thereof. The depending wall 83 has its lower end spaced upwardly from the bottom of the exhaust chamber 80 so that the air introduced from the duct 37 is firstly to come into collision with the side wall opposite of the duct 37, then directed downwardly in the rear section 82 and forwardly into the front section 81, and finally discharged out through the outlet 12. The rear section 82 is provided on the interior surface opposite of the duct 37 with a baffle member 84 made of unwoven fabric or the like in order to catch residual grease still carried on the air as well as to reduce the noise produced by the air flowing outwardly of the outlet 12. The rear section 82 is also provided at its lower end adjacent the baffle member 84 with a tap 85 for draining the grease trapped in the rear section 82. Thus, the clean air can be discharged through the outlet 12 of the grease extractor of the present invention.

What is claimed is:

1. A grease extractor for removing grease from a grease laden air and discharging a clean air after removal of the grease, said grease extractor comprising:
   a vessel having an inlet for introducing the grease laden air and an outlet for discharging the clean air, said vessel defining therein a flow path extending from said inlet to said outlet;
   centrifugal fan means for receiving air inwardly and directing air outwardly provided in said flow path between said inlet and said outlet to generate a forced flow for introducing said grease laden air through said inlet and forcing said air to said outlet along said flow path, said fan means having a circumferential fan surface;
   at least one membrane filter having a closed front surface, an open rear surface and a circumferential membrane surface, the circumferential membrane surface being connected to said vessel by an impervious wall for directing air through said circumferential membrane surface, said membrane filter disposed between said fan means and said outlet in said flow path to separate said grease from said air and permit said air to pass therethrough; and
   grease trap means disposed upstream of said membrane filter and between said membrane filter and said fan means, said trap means being defined on an interior wall of said vessel and arranged so that said grease laden air passes in one direction through said fan means and is deflected by said trap mans for causing collision of said grease laden air against said trap means and depositing said grease thereon, said air deflected so as to pass in an opposite recovery means for collecting and draining deposited grease out of said vessel;
   said membrane filter being thin enough such that relatively small grease particles once seized in said membrane filter are allowed to move by the action of said forced flow to the downstream surface of said membrane filter and coagulate to form thereat larger grease particles which are caused to leave from said membrane filter so as to be again carried on said forced flow toward said outlet.

2. A grease extractor for removing grease form a grease laden air and discharging a clean air after removal of the grease, said grease extractor comprising:
   a vessel having an inlet for introducing the grease laden air and an outlet for discharging the clean air,
   a plurality of separator units disposed in said vessel between said inlet and said outlet, each of said separator units comprising:
   a casing with an intake port and an exit port which define therebetween a flow path for said grease laden air,
   a centrifugal fan for receiving air inwardly and directing air outwardly provided in said flow path between said intake port and said exit port for generating a forced flow for forcing said grease laden air form said intake port toward said exit port along said flow path, said fan having a circumferential fan surface,
   a membrane filter having a closed front surface, an open rear surface and a circumferential membrane surface, the circumferential membrane surface being connected to said vessel by an impervious wall for directing air through said circumferential membrane surface, said membrane filter disposed in said flow path between said fan and said exit port for separating said grease from said air and permitting said air to pass therethrough; and
   a grease trap member disposed between said fan and said membrane filter, said trap member defined on an interior wall of said casing and being arranged so that said grease laden air passes in one direction through said fan means and is deflected by said trap member for causing collision of said grease laden air against said trap member and depositing said grease thereon, said air deflected by said trap member substantially reversing direction so as to pass in an opposite direction through said membrane filter, said trap member including recovery means for collecting and draining deposited grease out of said casing;
   said separator units being arranged in series between said inlet and output in such a manner as to communicate the intake port and the exit port between the adjacent units, to communicate said intake port of a first upstream one of said separator units with said inlet and to communicate said exit port of the last downstream one of said separator units with said outlet;

each of said membrane filters being thin enough such that relatively small grease particles once seized in said membrane filter of the separator unit are allowed to move by the action of said forced flow to the downstream surface of said membrane filter to coagulate to form thereat larger grease particles which are then caused to leave from said membrane filter and again be carried on said forced air flow entering the downstream separator in which the forced air flow collides with said trap member therein to separate the grease for recovery thereof from that causing.

3. A grease extractor as set forth in claim 2, wherein said trap member extends over the peripheries of said fan and said filter in a radially spaced relation thereto, said trap member formed with a plurality of grooves for retaining the grease deposited thereon, said grooves being spaced circumferentially about the axis of said fan and extending in an inclined relation with respect to the axis of said fan, said grooves terminating into a trough extending circumferentially in said trap member for collecting the grease into said trough, and said trough being slotted to have a drain for recovering the collected grease therethrough outwardly of said casing.

4. A grease extractor as set fort in claim 2, wherein each of said fans is a centrifugal fan rotating about a common center axis and is formed with said intake port about said common center axis and with a plurality of radially extending blades for drawing said grease laden air from said intake port and flowing the forced air flow radially outwardly of said fan, and wherein said separator unit includes a barrel which is located downstream of the fan within the same separator unit and comprises an axially spaced pair of front and bottom plates defining therebetween an open space, said filter provided in the form of a ring supported on said barrel to surround a periphery of said open space such that the grease laden air flowing from the adjacent fan and deflected at said trap member at the inner surface of the separator unit is allowed to pass said filter radially inwardly into said open space, said rear plate being perforated to define said exit port so as to emerge said grease laden air out of said barrel and feed the same into the intake port of the fan in the next separator unit.

5. A grease extractor as set forth in claim 4, wherein said barrel includes a plurality of radially extending vanes between said front and rear plates for guiding said grease laden air radially inwardly from said filter to said exit port.

6. A grease extractor as set forth in claim 4, wherein the blades of said fan are bent in the circumferential direction of said fan.

7. A grease extractor as set forth in claim 4, wherein the vanes of said barrel are bent in the circumferential direction of said barrel.

* * * * *